United States Patent
Lee et al.

(10) Patent No.: US 10,012,782 B2
(45) Date of Patent: Jul. 3, 2018

(54) BACKLIGHT APPARATUS AND DISPLAY APPARATUS HAVING THE SAME

(71) Applicant: SAMSUNG ELECTRONICS CO., LTD., Suwon-si (KR)

(72) Inventors: Won Yong Lee, Suwon-si (KR); Sang Hyun Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 14/820,753

(22) Filed: Aug. 7, 2015

(65) Prior Publication Data

US 2016/0170122 A1 Jun. 16, 2016

(30) Foreign Application Priority Data

Dec. 15, 2014 (KR) .................... 10-2014-0180471

(51) Int. Cl.
*F21V 8/00* (2006.01)
(52) U.S. Cl.
CPC ......... *G02B 6/0016* (2013.01); *G02B 6/0025* (2013.01); *G02B 6/0031* (2013.01); *G02B 6/0038* (2013.01); *G02B 6/0061* (2013.01); *G02B 6/0068* (2013.01); *G02B 6/0073* (2013.01); *G02B 6/0036* (2013.01)
(58) Field of Classification Search
CPC .. G02B 6/0016; G02B 6/0025; G02B 6/0031; G02B 6/0038; G02B 6/0061; G02B 6/0068; G02B 6/0073; G02B 6/0036; G02B 6/0035; G02F 1/133615; F21V 2200/20
See application file for complete search history.

(56) References Cited

U.S. PATENT DOCUMENTS

| 6,072,551 | A | 6/2000 | Jannson et al. | |
|---|---|---|---|---|
| 6,454,452 | B1* | 9/2002 | Sasagawa | G02B 6/0061 349/65 |
| 6,494,585 | B1* | 12/2002 | Wada | G02B 6/0036 349/63 |
| 7,156,548 | B2* | 1/2007 | Teng | G02B 6/0038 362/623 |
| 2005/0213348 | A1 | 9/2005 | Parikka et al. | |
| 2005/0243574 | A1* | 11/2005 | Teng | G02B 6/0038 362/600 |
| 2006/0034099 | A1 | 2/2006 | Yang et al. | |
| 2006/0198598 | A1 | 9/2006 | Fang et al. | |
| 2008/0043488 | A1* | 2/2008 | Lee | G02B 6/0038 362/606 |
| 2009/0147180 | A1 | 6/2009 | Chang | |

(Continued)

FOREIGN PATENT DOCUMENTS

| CN | 1743911 A | 3/2006 |
|---|---|---|
| JP | 10-170916 A | 6/1998 |

(Continued)

OTHER PUBLICATIONS

Communication dated May 23, 2016, issued by the European Patent Office in counterpart European Application No. 15187212.4.

(Continued)

*Primary Examiner* — Bao Q Truong
(74) *Attorney, Agent, or Firm* — Sughrue Mion, PLLC

(57) ABSTRACT

Disclosed herein are a backlight apparatus and a display apparatus having a light guide plate that includes light guide patterns in a waveform shape.

29 Claims, 13 Drawing Sheets

(56) References Cited

U.S. PATENT DOCUMENTS

2010/0302802 A1* 12/2010 Bita .................... G02B 6/0036
362/606
2013/0249385 A1 9/2013 Fujimura et al.
2014/0104881 A1* 4/2014 Yang .................... G02B 6/0038
362/611

FOREIGN PATENT DOCUMENTS

| JP | 10-268307 A | 10/1998 |
|----|----|----|
| JP | 10-282343 A | 10/1998 |
| JP | 2002352614 A | 12/2002 |
| JP | 2005-347122 A | 12/2005 |
| JP | 2008-103110 A | 5/2008 |
| KR | 10-2011-0123829 A | 11/2011 |

OTHER PUBLICATIONS

Communication dated Jun. 5, 2015 issued by the Korean Intellectual Property Office in counterpart Korean Patent Application No. 10-2014-0180471.

Communication dated Jun. 22, 2017 by the European Patent Office in counterpart European Patent Application No. 15187212.4.

* cited by examiner

BACKLIGHT APPARATUS AND DISPLAY APPARATUS HAVING THE SAME

CROSS-REFERENCE TO RELATED APPLICATION

This application claims priority from Korean Patent Application No. 10-2014-0180471, filed on Dec. 15, 2014, in the Korean Intellectual Property Office, the disclosure of which is incorporated herein by reference in its entirety.

BACKGROUND

1. Field

Methods and apparatuses consistent with exemplary embodiments of the present disclosure relate to a backlight apparatus and a display apparatus having the same, and more particular, to a backlight apparatus having an improved structure to uniformly supply light source to a display panel, and a display apparatus having the same.

2. Description of the Related Art

In general, a display apparatus includes a display panel composed of liquid crystal panels is configured to display a screen, and a backlight is configured to supply light to the display panel.

The backlight includes a light source, and a light guide plate configured to guide light, which is received from the light source, towards the display panel. The light guide plate refracts, reflects, and scatters light received from the light source and guides the light to the display panel.

However, in this process, light reflected from the light source may be nonuniformly scattered. Therefore, a bright line may be generated on the display panel and light efficiency may be decreased.

SUMMARY

Aspects of the exemplary embodiments provide a backlight apparatus capable of uniformly delivering light, which is emitted from a light source, to a display panel, and a display apparatus having the same.

Additional aspects will be set forth in part in the description which follows and, in part, will be obvious from the description, or may be learned by practice thereof.

In accordance with an aspect of an exemplary embodiment, there is provided a backlight apparatus including light sources configured to generate light and a light guide plate configured to guide the generated light towards a display panel, wherein the light guide plate comprises light guide patterns provided in a length direction that is a first direction in which the plurality of the light sources is disposed, and wherein the light guide patterns is configured to form a waveform transverse in the first direction.

The waveform may be a sinusoidal waveform of a plurality of grooves disposed towards the light source and a plurality of threads interconnecting the plurality of grooves and disposed away from the light source, wherein the plurality of grooves and the plurality of threads are alternately disposed.

The light guide plate may include an incident surface upon which the light is incident, an exit surface from which the light is emitted, and a reflective surface opposing the exit surface, wherein the light guide patterns are disposed on the reflective surface.

The light guide patterns may include a pattern protrusion part configured to form the waveform, a first inclined surface extended from the reflective surface towards the pattern protrusion part, and a second inclined surface extended from the reflective surface towards the pattern protrusion part, wherein the first inclined surface is disposed closer to the plurality of light sources than the second inclined surface.

The first inclined surface and the second inclined surface may have a shape of the waveform.

The pattern protrusion part may be a certain height from the reflective surface that is disposed closer to the exit surface than the reflective surface.

The light guide patterns may include a first light guide pattern adjacent to the incident surface, and a second light guide pattern adjacent to the first light guide pattern, wherein the second light guide pattern is larger than the first light guide pattern.

The light source may include a first light source provided on a first side of the light guide plate, and a second light source provided on a second side of the light guide plate, the first side of the light guide plate opposing the second side of the light guide plate, wherein the light guide patterns includes a pattern protrusion part configured to form the waveform, a first inclined surface extended from the reflective surface towards the pattern protrusion part, and a second inclined surface extended from the reflective surface towards the pattern protrusion part.

The first light source and the second light source may include a first plurality of light emitting diodes (LEDs) and the second light source comprises a second plurality of LEDs, respectively, which are spaced apart from each other in the first direction.

The light guide patterns may include a plurality of sub light guide patterns provided in parallel to the light source and spaced apart from to each other.

The plurality of sub light guide patterns may include a first array of sub light guide patterns arranged in parallel to the light source, and a second array of sub light guide patterns adjacent to the first array, wherein the first array of sub light guide patterns and the second array of sub light guide patterns are parallel to each other.

The plurality of sub light guide patterns may include a first plurality of sub light guide patterns of a first array in parallel to the light source, and a second plurality of sub light guide patterns of a second array adjacent to the first array, wherein the first plurality of sub light guide patterns of the first array and the second plurality of sub light guide patterns of the second array are alternately disposed.

The plurality of sub light guide patterns may include a first plurality of sub light guide patterns of a first array in parallel to the light source, and a second plurality of sub light guide patterns of a second array adjacent to the first array, wherein the second plurality of sub light guide patterns of the second array is formed to be larger than the first plurality of sub light guide patterns of the first array.

The light source may include a plurality of light emitting diodes (LEDs) spaced apart from each other in the first direction in at least one side of the light guide plate.

The pattern protrusion part may be formed in a rounded shape.

The pattern protrusion part may be formed by a tangent line of the first inclined surface and the second inclined surface.

The light guide patterns may be formed in a way that a cross section thereof has a semi-circular shape or a semi-ovular shape.

The waveform of the light guide patterns may be formed to have a wavelength of 20~50 μm.

The waveform of the light guide patterns may be formed to have an amplitude of 1~2 μm.

The light guide patterns may be formed to be concave with respect to the reflective surface in the light guide plate, wherein the reflective surface comprises a reflection coating applied to the reflective surface so that the path of light incident from the incident surface is guided to the exit surface.

The backlight apparatus may further include a diffusion unit disposed between the light guide plate and the light source, the diffusion unit configured to disperse light emitted from the light source and incident to the incident surface.

The diffusion unit may include at least one of a diffusion member and a reflective polarizing film.

The diffusion unit may further include a prism sheet.

In accordance with an aspect of an exemplary embodiment, there is provided a display apparatus including a display panel, and a backlight apparatus supplying light to the display panel, wherein the backlight apparatus includes light sources and a light guide plate configured to guide light incident from the light source towards the display panel, wherein the light guide plate includes an incident surface upon which the light is incident, an exit surface from which the light is emitted, and light guide patterns provided in parallel to the incident surface, and configured to guide the light incident from the incident surface to the exit surface, and the light guide patterns configured to form a waveform transverse in a direction parallel to the incident surface.

In accordance with an aspect of an exemplary embodiment, there is provided a backlight apparatus including a light guide plate provided with light guide patterns formed shaped as a waveform, the light guide plate configured to guide incident light towards a display panel, a first light source provided on a first side of the light guide plate, and a second light source provided on a second side of the light guide plate, the second side of the light guide plate opposing the first side of the light guide plate, wherein the light guide plate includes a pattern protrusion part configured to form the waveform, a first inclined surface extended from the reflective surface towards the pattern protrusion part, and a second inclined surface extended from the reflective surface towards the pattern protrusion part.

In accordance with an aspect of an exemplary embodiment, there is provided a backlight apparatus including light sources configured to generate light, the light sources arranged in a length direction of the backlight apparatus and a light guide plate configured to guide the generated light towards a display panel, wherein the light guide plate includes light guide patterns, the light guide patterns comprising a plurality of sub light guide patterns arranged in parallel with the light source and to be spaced apart from to each other, at least one of the plurality of sub light guide patterns configured to form a waveform transverse in the length direction.

BRIEF DESCRIPTION OF THE DRAWINGS

The above and other aspects will become apparent and more readily appreciated from the following description of the exemplary embodiments, taken in conjunction with the accompanying drawings of which.

DETAILED DESCRIPTION

Figure 1:
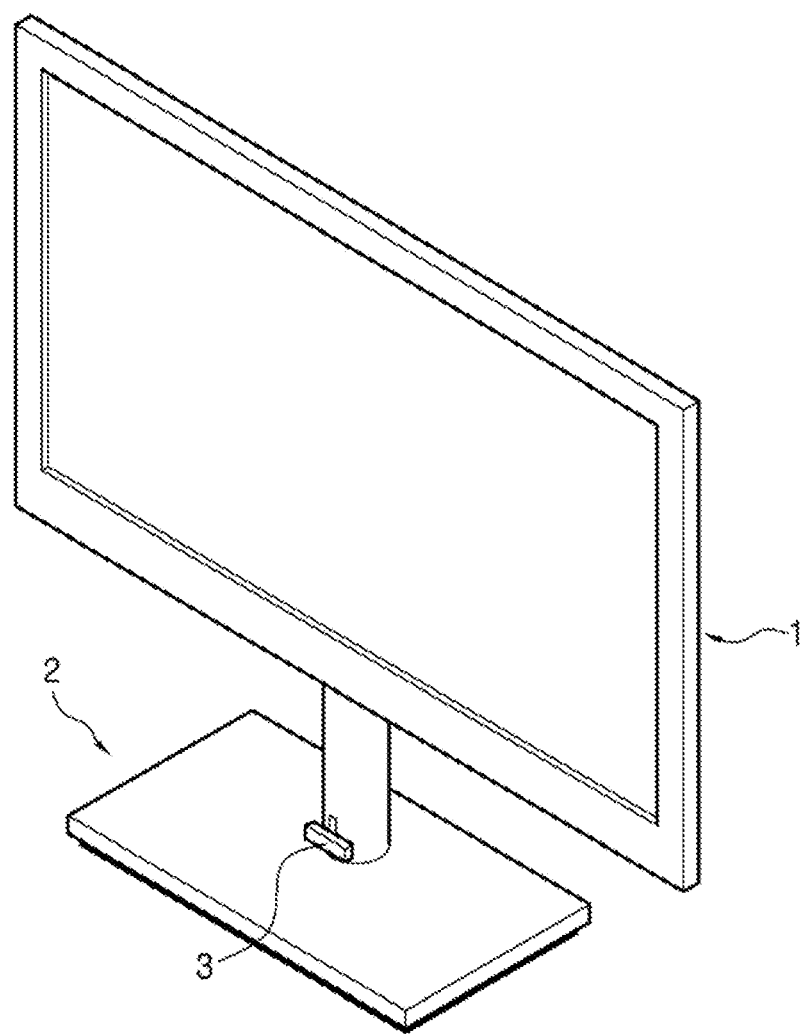
FIG. 1 is a perspective view illustrating a display apparatus in accordance with a first exemplary embodiment of the present disclosure.

Reference will now be made in detail to the exemplary embodiments of the present disclosure, examples of which are illustrated in the accompanying drawings, wherein like reference numerals refer to like elements throughout.

Figure 2:
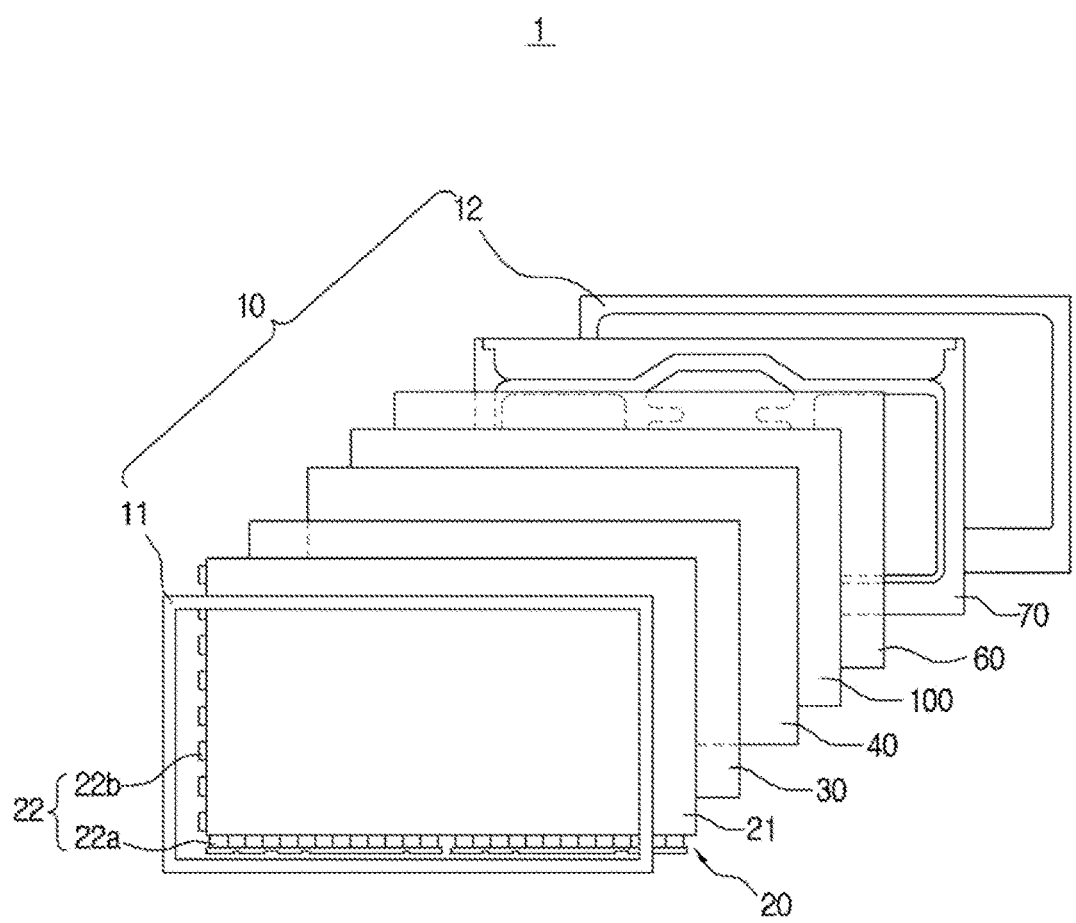
FIG. 2 is an exploded perspective view illustrating a display apparatus in accordance with a first exemplary embodiment of the present disclosure.

FIG. 1 is a perspective view of a display apparatus in accordance with a first exemplary embodiment of the present disclosure, and FIG. 2 is an exploded perspective view of a display apparatus in accordance with a first exemplary embodiment of the present disclosure.

As illustrated in FIG. 1, a display apparatus includes a main body 1, on which an image is displayed and from which sound is output, a stand 2 mounted to the lower end of the main body 1 and supporting the main body 1 in the upward direction, and a multimedia module 3 mounted on the stand 2. The multimedia module 3 may acquire an image of a user and the environment around the user and sound in the environment, and transmit the acquired image and sound to the main body 1. The sound may be output through a device within the environment of the display apparatus.

The display apparatus may be a TV, a monitor, and the like.

Particularly, as illustrated in FIG. 2, the main body 1 includes a case 10, a display panel 20, a support member 30, an optical sheet 40, a backlight apparatus 100, a chassis 60, and a reinforcing member 70.

The case 10 includes a bezel 11 and a cover 12. The cover 12 may be a rear cover of the display apparatus.

The bezel 11 and the cover 12 are detachably coupled to each other and, when the bezel 11 and the cover 12 are coupled to each other, an accommodation space is formed therein.

That is, the display panel 20, the support member 30, the optical sheet 40, the backlight apparatus 100, the chassis 60, and the reinforcing member 70 are disposed in the case 10, and the case 10 protects the display panel 20, the support member 30, the optical sheet 40, the backlight device 100, the chassis 60, and the reinforcing member 70, all of which are disposed therein.

The display panel 20 includes a liquid crystal panel 21 and a driving module 22.

In addition, glass and a filter protecting the display panel 20 from external impact may be provided within the case 10 at a viewing side of the display panel 20.

The glass prevents the filter from being damaged by external impact, and the filter includes an optical characteristic film, an electromagnetic interference (EMI) shielding film, and an infrared light shielding film.

The optical characteristic film lowers brightness of red light (R) and green light (G) among light incident upon the display panel 20 and raises brightness of blue light (B) and thus improves optical characteristics. The EMI shielding film shields electromagnetic waves and prevents electromagnetic waves incident upon the display panel 20 from being discharged from the display apparatus.

Further, the infrared light shielding film shields infrared light emitted from the display panel 20 and prevents infrared light from being discharged from the display apparatus so that signals transmitted using infrared light, such as signals from a remote controller to the display apparatus, may be transmitted without interference.

The liquid crystal panel 21 includes a pair of substrates and liquid crystals injected into a gap between the pair of substrates.

One of the pair of substrates includes a plurality of thin film transistors (hereinafter, referred to as "TFT") arranged in a matrix and the other of the pair of substrates includes a common electrode formed of indium tin oxide (ITO).

The driving module 22 includes first driving units 22a driving X electrodes disposed in a horizontal direction and second driving units 22b driving Y disposed in a vertical direction.

Here, the X electrodes are source electrodes and the Y electrodes are gate electrodes.

The first driving units 22a and the second driving units 22b, which transmit driving signals to data lines and gate lines, are connected to a control module.

The first driving units 22a select gray-scale voltages according to data lines based on image data and transmit the selected gray-scale voltages to the liquid crystals through the data lines.

The second driving units 22b transmit on/off signals based on the image data to switching elements, i.e., the TFTs, through scan lines, thereby activating or deactivating the TFTs.

That is, when the first driving units 22a supply voltages corresponding to respective color values, the second driving units 22b serve to receive the voltages and provide the voltages to corresponding pixels.

The source electrodes of the TFTs are connected to the data lines, the gate electrodes are connected to the scan lines, and drain electrodes of the TFTs are connected to pixel electrodes of ITO. When a scan signal is supplied to the scan lines, the TFTs are turned on and supply data signals supplied from the data lines to the pixel electrodes.

A predetermined voltage is applied to the common electrode and thus, an electric field is formed between the common electrode and the pixel electrodes. The orientation angle of the liquid crystals between the substrates of the liquid crystal panel is changed by the electric field and light transmittance is changed by the changed orientation angle, thus a desired image is displayed.

The display panel 20 may output a three dimensional (3D) image. Particularly, the display panel 20 may display a left eye image recognized by a user's left eye and a right eye image recognized by a user's right eye. Here, the left eye image and the right eye image may mean different images, although the left eye image and the right eye image are related to each other. When the user respectively recognizes the left eye image and the right eye image through the left and right eyes, the brain of the user may recognize a 3D image and experience 3D effect though fusion of the planar images.

The support member 30 supports the display panel 20 disposed between the support member 30 and the bezel 11 and supports the optical sheet 40 and the backlight device 100 disposed between the support member 30 and the cover 12.

The optical sheet 40 enhances brightness of light supplied from the backlight device 100 and then supplies the light to the display panel 20. That is, the optical sheet 40 increases light from light emitting diodes of the backlight device 100 and maintains uniform brightness at the overall surface of the backlight device 100.

The chassis 60 is a board connecting various components, which are required to display an image and to output sound. Various modules and speakers are mounted on the chassis 60.

The reinforcing member 70 is disposed between the bezel 11 and the cover 12 and eliminates joints between the bezel 11 and the cover 12. The reinforcing member 70 is formed of reinforced plastic.

The backlight device 100 supplies light to the display panel 20. Particularly, a plurality of patterns controlling light may be formed on the backlight device 100 so that the display panel 20 may display a 3D image.

Figure 3:
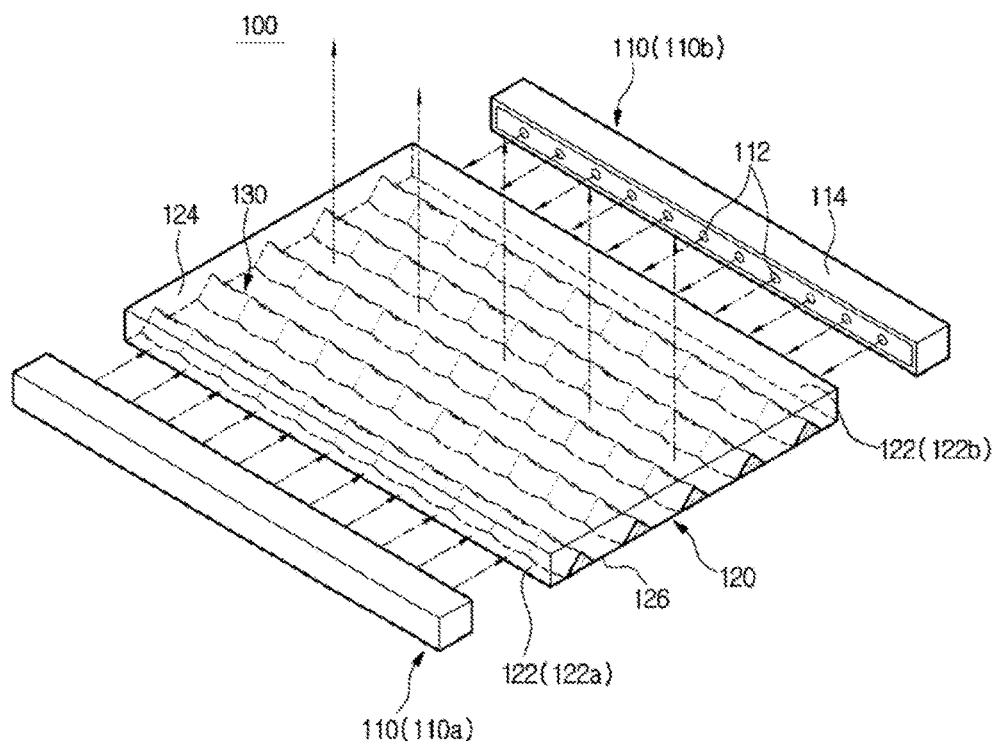
FIG. 3 is perspective view illustrating a backlight apparatus in accordance with a first exemplary embodiment of the present disclosure.
Figure 4:
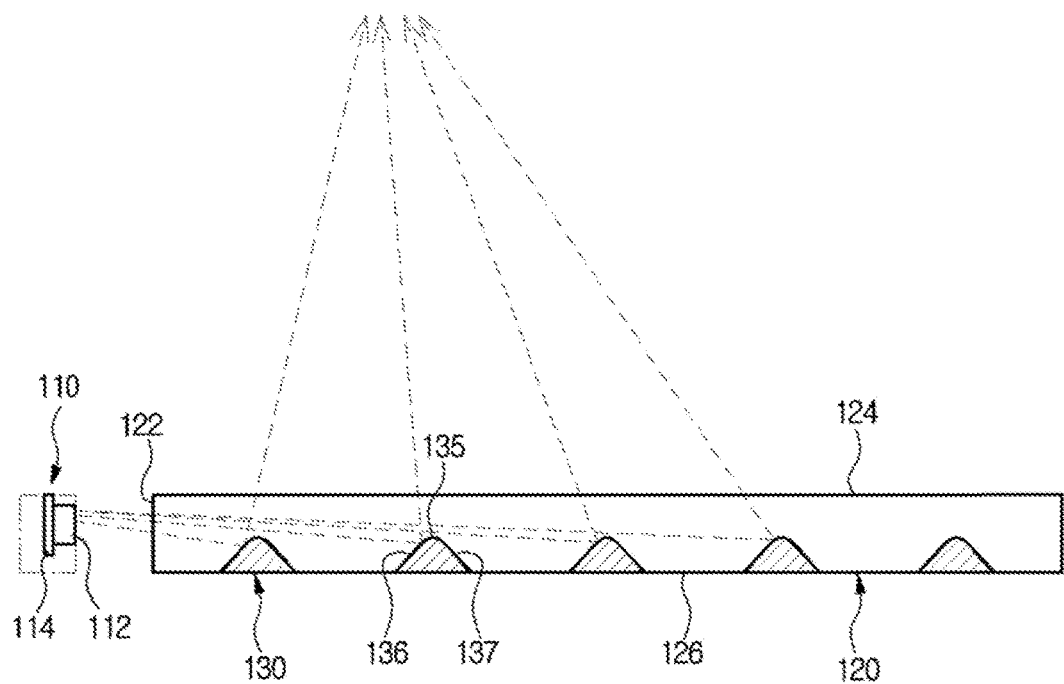
FIG. 4 is a cross-sectional view illustrating a backlight apparatus in accordance with a first exemplary embodiment of the present disclosure.
Figure 5:
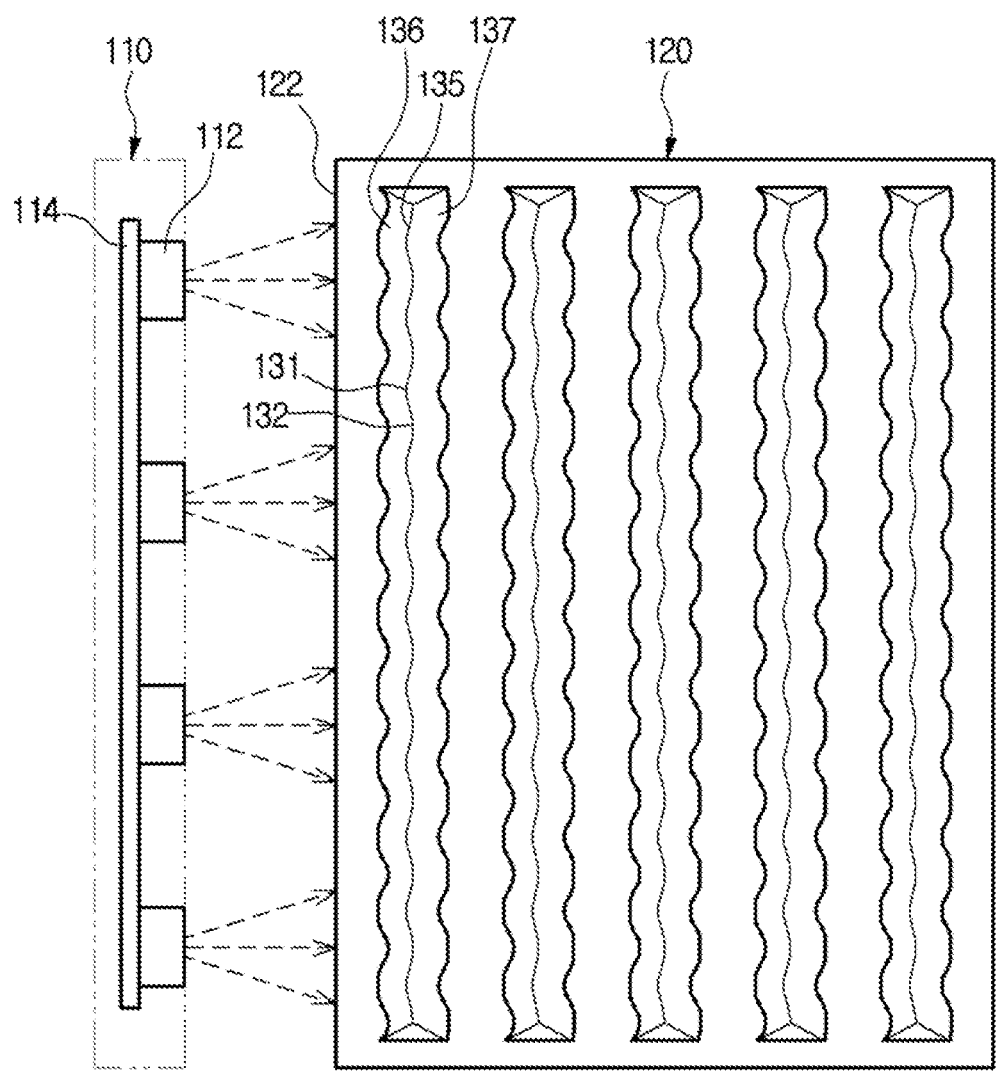
FIG. 5 is a front view illustrating a backlight apparatus in accordance with a first exemplary embodiment of the present disclosure.

FIG. 3 is perspective view of a backlight apparatus in accordance with a first exemplary embodiment of the present disclosure, FIG. 4 is a cross-sectional view of a backlight apparatus in accordance with a first exemplary embodiment of the present disclosure, and FIG. 5 is a front view of a backlight apparatus in accordance with a first exemplary embodiment of the present disclosure.

The backlight device 100 includes light sources 110 generating light and a light guide plate 120 guiding the path of the generated light towards the display panel.

The light source 110 may include a plurality of light emitting diodes (LEDs) 112 generating light and an LED cover 114 in which the light emitting diodes 112 are disposed.

The plurality of LEDs 112 may be arranged in a horizontal configuration, though the horizontal arrangement is only exemplary. The LED cover 114 may cover the plurality of LEDs 112 and may be structured to have one open side. That is, the LED cover 114 may include an open opening on a side thereof. The LEDs 112 may be positioned to emit light towards the light guide plate 120 through the open side of the LED cover 114.

The light guide plate 120 may be formed in a rectangular plate shape. The light guide plate 120 may include an incident surface 122 upon which light is incident, an exit surface 124 through which light is emitted, and a reflective surface 126 opposing the exit surface 124.

The incident surface 122 may be defined as one of surfaces of the light guide plate 120. In the exemplary embodiment of the present disclosure, the light source 110 is disposed on one side of the light guide plate 120 so that the incident surface 122 may be defined as a single incident surface 122. Alternatively, when the light source is disposed on one side and the other side with respect to the light guide plate 120, the incident surface 122 may be disposed on one side and the other side of the light guide plate 120, but the configuration is not limited thereto. The light guide plate 120 may be provided in plural.

The incident surface 122 is provided to be adjacent surface to the light source 110 on the light guide plate 120, so that light emitted from the light source 110 is introduced into the inside of the light guide plate 120 through the incident surface 122.

The introduced light by the incident surface 122 may be totally reflected by the reflective surface 126 and the exit surface 124.

The light guide plate 120 may include light guide patterns 130.

Light emitted from a plurality of LEDs 112 arranged in one direction may be refracted, reflected, and dispersed by the light guide patterns 130 of the light guide plate 120, and uniformly transmitted to the display panel through the exit surface 124. The light guide patterns 130 may be provided on the reflective surface 126.

The light guide patterns 130 may be formed in parallel to the light source 110. In the exemplary embodiment of the present disclosure, the light source 110 may be formed by the plurality of LEDs 112 arranged in one direction so that the light guide patterns 130 may be arranged in one direction to be parallel to the plurality of LEDs 112. The light guide patterns 130 may be parallel to the incident surface 122. Particularly, the light source 110 may include a plurality of LEDs 112 spaced apart from at least one side of the light guide plate 120 in a first direction, and thus the light guide patterns 130 may be formed in the first direction.

The light guide patterns 130 may be provided to form a waveform in a length direction, in which the length direction is the first direction. The light guide patterns 130 may be provided to form a waveform in the left and right toward both side surfaces of the light guide plate 120. That is, the light guide patterns 130 may be provided with a plurality of grooves 131, and a plurality of threads 132 formed between the plurality of grooves. The plurality of grooves 131 and the plurality of threads 132 are alternately formed with each other. The plurality of grooves 131 is formed to be close to the light source 110, and the plurality of threads 132 is formed to be far from the light source 110.

Because the light guide patterns 130 generate waveforms, light emitted from the light source 110 may be reflected in various directions so that light may be uniformly supplied to the display panel.

In the exemplary embodiment of the present disclosure, a waveform is a Sine wave, but the waveform is not limited thereto, and may be an irregular waveform.

There is no limitation for a wave length and an amplitude of a waveform, but according to the exemplary embodiment of the present disclosure, a wave length of the light guide patterns may be 20~50 μm, and an amplitude thereof may be 1~2 μm.

A cross section of the light guide patterns 130 may have an approximately triangular shape, but the shape is not limited thereto. The cross section of the light guide patterns 130 may have a circular or ovular shape.

The light guide patterns 130 may include a pattern protrusion part 135 forming a wave form, a first inclined surface 136, and a second inclined surface 137.

The pattern protrusion part 135 is provided to form a waveform by protruding with a certain height from the reflective surface 126. The waveform may be formed in at least part of the pattern protrusion part 135. According to the exemplary embodiment of the present disclosure, the waveform is formed in the entire pattern protrusion part 135.

A height of the entire of the pattern protrusion part 135 may have a certain height from the reflective surface 126. A height of the pattern protrusion part 135 is not limited, but may not be higher than a certain height so that light introduced from the incident surface 122 may be uniformly transmitted to the display panel.

The pattern protrusion part 135 may be formed to be higher toward the exit surface 124 than toward adjacent reflective surface 126. That is, the pattern protrusion part 135 may be formed to protrude toward the reflective surface 126.

The first inclined surface 136 may be extended from the reflective surface 136, and may be provided to be opposite to the light source 110. The first inclined surface 136 may be formed to be inclined from the pattern protrusion part 135 to the reflective surface 126 in a direction that is close to the light source 110.

The second inclined surface 137 may be disposed in the other side of the first inclined surface 136 with respect to the pattern protrusion part 135, and inclined from the pattern protrusion part 135 to the reflective surface 126.

In FIGS. 4 and 5, a relationship of a single light source 110 and the light guide plate 120 is described, but when a plurality of light sources 110 is provided in both sides of the light guide plate 120, as illustrated in FIG. 3, the first inclined surface 136 and the second inclined surface 137 may be disposed at opposite sides to each of the light source 110.

That is, the light source 110 may include a first light source 110*a* disposed in one side of the light guide plate 120, and a second light source 110*b* disposed in the other side of the light guide plate 120. The first light source 110*a* and the second light source 110*b* may include the plurality of LEDs 112 disposed to be spaced apart from to each other in the first direction. Also the light guide patterns 130 may be disposed in the first direction. At this time, the first inclined surface 136 may be disposed to be opposite to the first light source 110*a*, and the second inclined surface 137 may be disposed to be opposite to the second light source 110*b*. Correspondingly, a first incident surface 122*a* corresponding to the first light source 110*a*, and in a second incident surface 122*b* corresponding to the second light source 110*b*, may be provided. The number of light sources 110 is not limited thereto, but in the exemplary embodiment of the present disclosure the light source 110 is disposed on one side.

A waveform generated by the pattern protrusion part 135, the first inclined surface 136, and the second inclined surface 137 may be the same. That is, a width of the light guide patterns 130 may be the same.

The pattern protrusion part 135 may have a rounded shape. That is, the pattern protrusion part 135 in which the first inclined surface 136 and the second inclined surface 137 are connected, may be formed in a curved surface, but the shape is not limited thereto. A part in which the first inclined surface 136 and the second inclined surface 137 are connected may be formed by a tangent line of the first inclined surface 136 and the second inclined surface 137. In addition, the pattern protrusion part 135 may have a planar shape to be parallel to the reflective surface 126, or may have one or more surface. Various shapes of the pattern protrusion part 135 will be described in other exemplary embodiments.

The light guide patterns 130 may be impressed, engraved, or otherwise designed on a lower portion of the light guide plate 120. Reflection coating is performed on a rear surface of the light guide patterns 130 impressed, engraved, or otherwise designed in the light guide plate 120 so that the reflection of the light may be improved.

The reflection coating may be formed by a metal film having a high reflectivity, such as silver (Ag) and aluminum (Al). In addition, by applying silver paste to the rear surface of the light guide plate 120, the reflection coating may be performed. Alternatively, the reflection coating may be performed by a polymer film having a relatively high reflectivity, such as Polyethylene Terephthalate (PET), Poly-Phenyl-Acetylene (PPA), and a resin film. The reflection coating may be provided by evaporating or coating material having a high reflectivity to the rear surface of the light guide plate 120, or by laminating a prepared reflection film to the rear surface of the light guide plate 120. Through a process, such as evaporation, coating, application, and lamination, a reflection member is closely attached to the rear surface of the light guide plate 120.

The light guide patterns 130 may include a first light guide pattern adjacent to the incident surface 122, and a second light guide pattern spaced more apart from the incident surface 122 than the first light guide patterns. At this time, the second light guide pattern may be larger than the first light guide pattern. Because the first light guide patterns is disposed to be closer to the light source 110 than the second light guide patterns, light introduced by the incident surface 122 may have a higher possibility of scattering light on the first light guide pattern than a possibility of scattering light on the second light guide pattern. Therefore, the nonuniformity may be compensated by increasing a size of the second light guide pattern.

Hereinafter a backlight apparatus 100 and a display apparatus having the same in accordance with a second exemplary embodiment of the present disclosure will be described.

Figure 6:
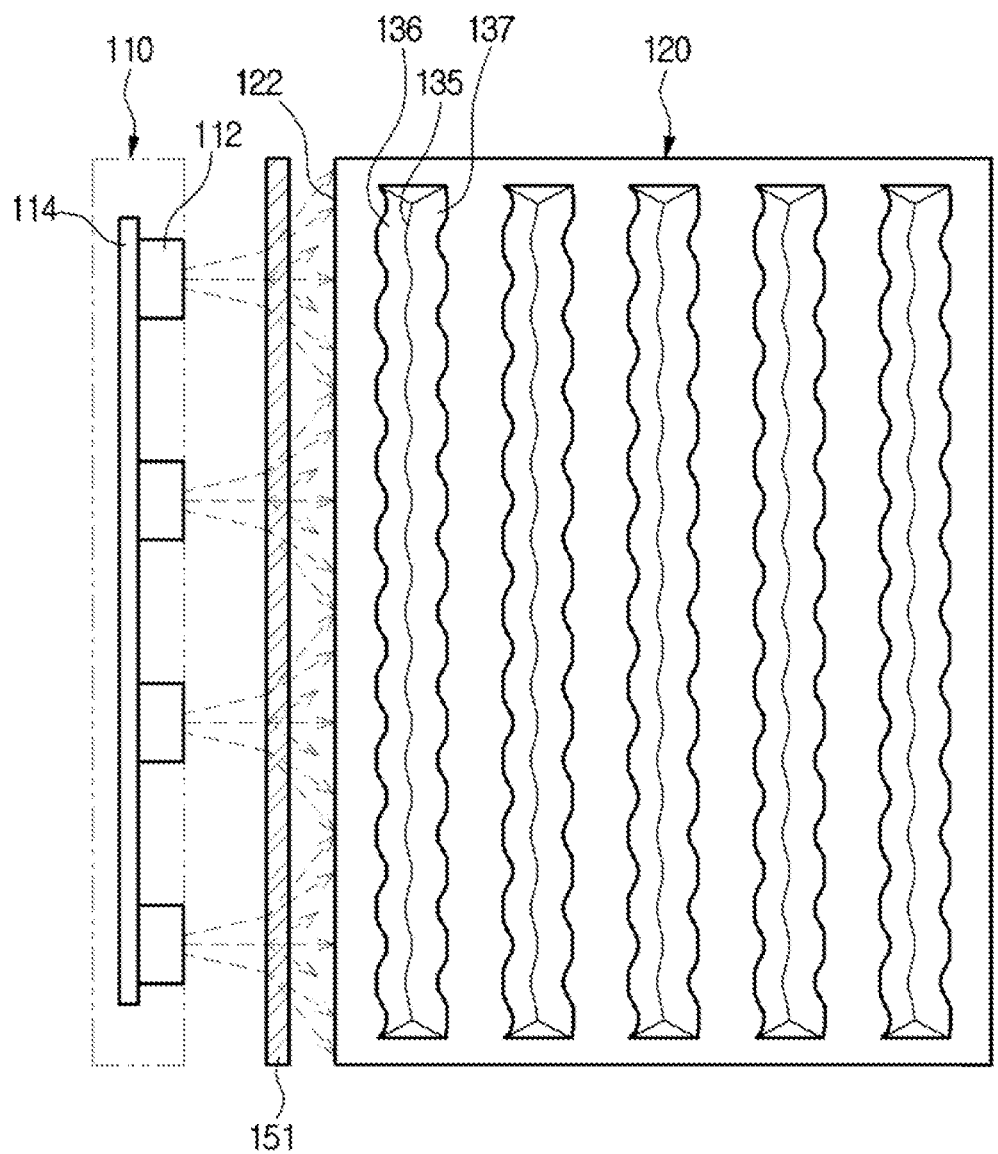
FIG. 6 is a front view illustrating a backlight apparatus in accordance with a second exemplary embodiment of the present disclosure.

FIG. 6 is a front view of a backlight apparatus in accordance with a second exemplary embodiment of the present disclosure.

A redundant description of components that are the same as those shown in the previous exemplary embodiment will be omitted.

A backlight apparatus 100 further includes a diffusion member 151.

The diffusion member 151 enables uniform distribution of light emitted from the light source 110 to be transmitted to the light guide plate 120. That is, the diffusion member 151 diffuses light emitted from the light source 110 such that the diffused light is transmitted to the light guide plate 120. In the exemplary embodiment of the present disclosure, the diffusion member 151 may be formed of white translucent material to diffuse light.

A first surface that is one side of the diffusion member 151 may be provided to face the light source 110, and a second surface that is the other side of the diffusion member 151 may be provided to face the incident surface 122 of the light guide plate 120. By using the structure, light emitted from the light source 110 is primarily diffused in the process in which the light is introduced into the diffusion member 151 thorough the first surface and then passed through the diffusion member 151, incident on the incident surface 122 of the light guide plate 220, and then secondarily distributed by the light guide patterns 130. Therefore, the light is more uniformly transmitted to the display panel.

The diffusion member 151 may have a width corresponding to the incident surface 122 of the light guide plate 120 so that light emitted from the light source 110 may be effectively distributed.

The diffusion member 151 may employ a diffusion sheet, a diffusion plate, or a lenticular component Hereinafter a backlight apparatus 100 and a display apparatus having the same in accordance with a third exemplary embodiment of the present disclosure will be described.

Figure 7:
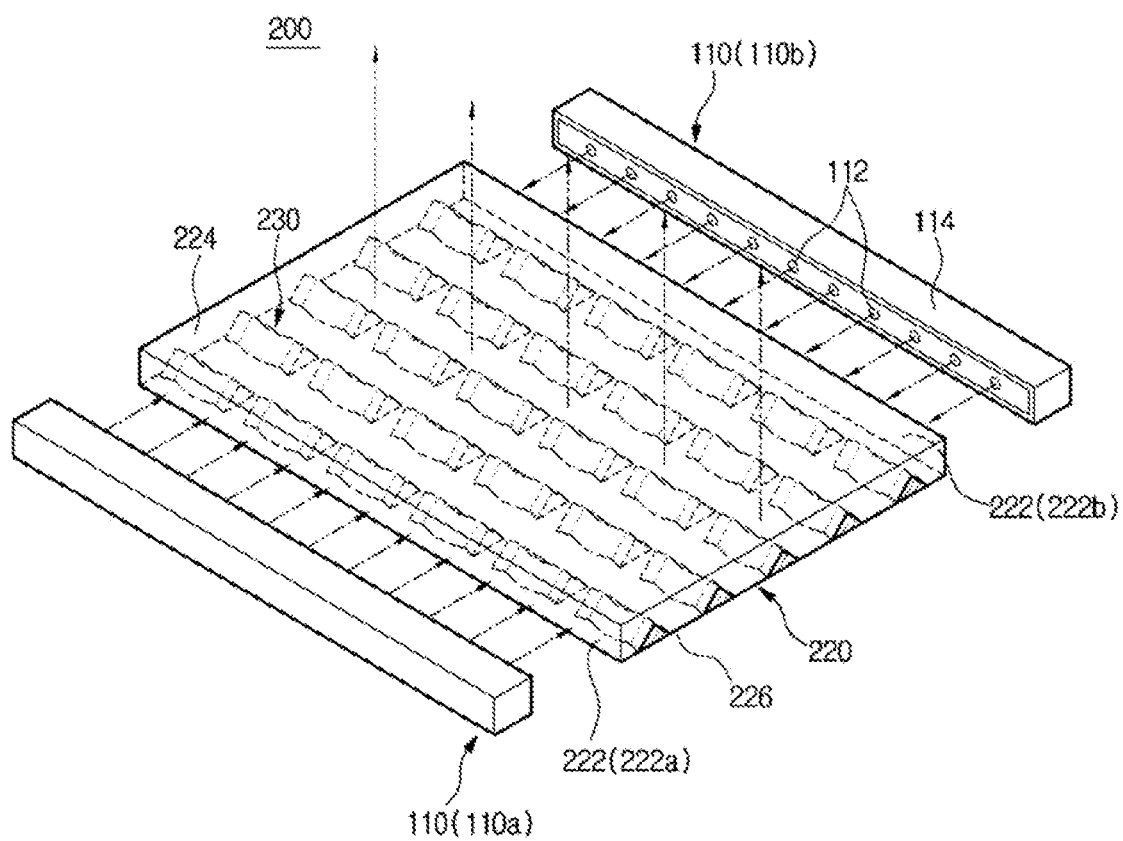
FIG. 7 is a perspective view illustrating a backlight apparatus in accordance with a third exemplary embodiment of the present disclosure.
Figure 8:
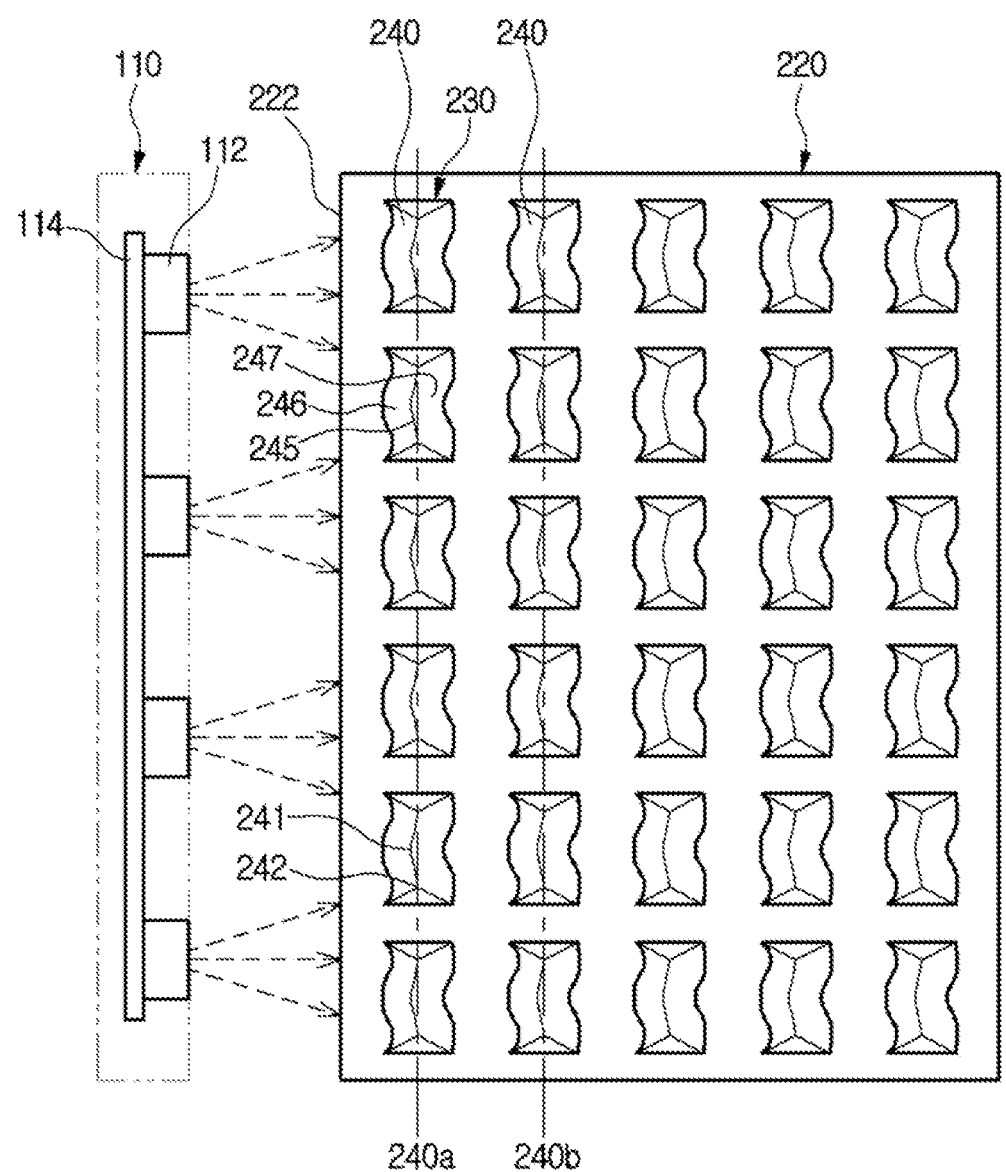
FIG. 8 is a front view illustrating a backlight apparatus in accordance with a third exemplary embodiment of the present disclosure.

FIG. 7 is a perspective view of a backlight apparatus in accordance with a third exemplary embodiment of the present disclosure, and FIG. 8 is a front view of a backlight apparatus in accordance with a third exemplary embodiment of the present disclosure.

A redundant description of the components that are the same as those shown in the previous exemplary embodiment will be omitted.

A light guide plate 220 may include an incident surface 222 upon which light is incident, an exit surface 224 through which light is emitted, and a reflective surface 226 opposing the exit surface 224.

The incident surface 222 may be defined as one of surfaces of the light guide plate 220. In the exemplary embodiment of the present disclosure, the light source is disposed on one side of the light guide plate 220 so that the incident surface 222 may be defined as a single incident surface. Alternatively, when the light source is disposed on one side and the other side with respect to the light guide plate 220, the incident surface 222 may be disposed on one side and the other side of the light guide plate, but the configuration is not limited thereto. The light guide plate 220 may be provided in plural.

The incident surface 222 is provided to be adjacent surface to the light source on the light guide plate 220, so that light emitted from the light source is introduced into the inside of the light guide plate 220 through the incident surface 222.

The light introduced by the incident surface 222 may be totally reflected by the reflective surface 226 and the exit surface 224.

The light guide plate 220 may include light guide patterns 230.

Light emitted from a plurality of LEDs arranged in one direction may be refracted, reflected, and dispersed by the light guide patterns 230 of the light guide plate 220, and uniformly transmitted to the display panel through the exit surface 224. The light guide patterns 230 may be provided on the reflective surface 226.

The light guide patterns 230 may include sub light guide patterns 240.

A plurality of sub light guide patterns 240 may be formed in parallel to the light source. In the exemplary embodiment of the present disclosure, the light source may be formed by the plurality of LEDs arranged in one direction so that the plurality of sub light guide patterns 240 may be arranged in one direction to be parallel to the plurality of LEDs.

The plurality of sub light guide patterns 240 is formed to be parallel to the light source, and the plurality of sub light guide patterns 240 may be spaced apart from to each other. A distance between which the plurality of sub light guide patterns 240 is spaced is not limited. In the exemplary embodiment of the present disclosure, the spacing between the plurality of sub light guide patterns 240 is equal.

The plurality of sub light guide patterns 240 may include a first array 240a in parallel to the light source, and a second array 240b adjacent to the first array 240a. In the exemplary embodiment of the present disclosure, the plurality of sub light guide patterns 240 of the first array 240a and the plurality of sub light guide patterns 240 of the second array 240b are disposed to be parallel to each other, but the configuration is not limited thereto. The plurality of sub light guide patterns 240 of the first array 240*a* and the plurality of sub light guide patterns 240 of the second array 240*b* may be variously disposed.

At this time, the light guide patterns 240 of the second array 240*b* may be larger than the plurality of sub light guide patterns 240 of the first array 240*a*. Because the plurality of sub light guide patterns 240 of the first array 240*a* is disposed to be closer to the light source than the light guide patterns 240 of the second array 240*b*, light introduced by the incident surface 222 may have a higher possibility of scattering light on the plurality of sub light guide patterns 240 of the first array 240*a* than on the plurality of sub light guide patterns 240 of the second array 240*b*. Therefore, the nonuniformity may be compensated by increasing a size of the plurality of sub light guide patterns 240 of the second array 240*b*.

The plurality of sub light guide patterns 240 may be provided to form a waveform in a length direction, in which the length direction is in parallel to the incident surface 222. The plurality of sub light guide patterns 240 may be provided to form a waveform to the left and right side toward both side surfaces of the light guide plate 220. That is, the plurality of sub light guide patterns 240 may be provided with a plurality of grooves 241, and a plurality of threads 242 formed between the plurality of grooves. The plurality of grooves 241 and the plurality of threads 242 are alternately formed with each other. The plurality of grooves 241 is formed to be close to the light source, and the plurality of threads 242 is formed to be far from the light source.

Because the plurality of sub light guide patterns 240 forms waveforms, light emitted from the light source may be reflected in various directions so that light may be uniformly supplied to the display panel.

In the exemplary embodiment of the present disclosure, a waveform is Sine wave, but the waveform is not limited thereto and may be an irregular waveform.

The waveform may have any wavelength and an amplitude, but according to the exemplary embodiment of the present disclosure, a wave length of the light guide patterns may be 20~50 μm, and an amplitude thereof may be 1~2 μm.

A cross section of the plurality of sub light guide patterns 240 may have an approximately triangular shape, but the shape is not limited thereto. The cross section of the plurality of sub light guide patterns 240 may have a circular or an ovular shape.

The plurality of sub light guide patterns 240 may include a pattern protrusion part 245, a first inclined surface 246, and a second inclined surface 247 each of which form a waveform.

Hereinafter, a backlight apparatus 100 and a display apparatus having the same in accordance with a fourth exemplary embodiment of the present disclosure will be described.

Figure 9:
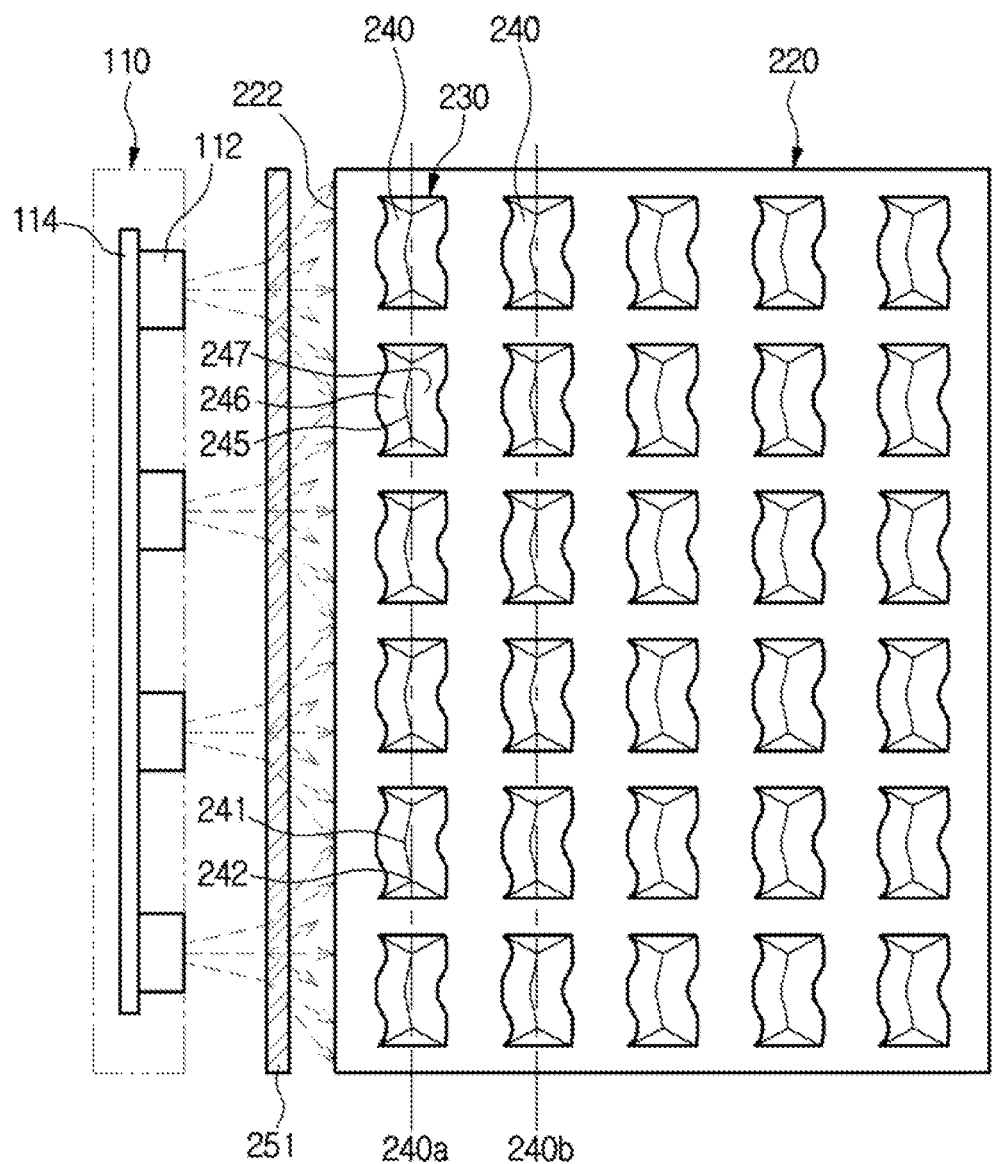
FIG. 9 is a front view illustrating a backlight apparatus in accordance with a fourth exemplary embodiment of the present disclosure.

FIG. 9 is a front view of a backlight apparatus in accordance with a fourth embodiment of the present disclosure.

A redundant description of components that are the same as those shown in the third exemplary embodiment will be omitted.

A backlight apparatus further includes a diffusion member 251.

The diffusion member 251 allows a uniform distribution of light emitted from the light source to be transmitted to the light guide plate 220. That is, the diffusion member 251 diffuses light emitted from the light source and transmits the diffused light to the light guide plate 220. In the exemplary embodiment of the present disclosure, the diffusion member 251 may be formed of white translucent material to diffuse light.

A first surface that is one side of the diffusion member 251 may be provided to face the light source and a second surface that is the other side of the diffusion member 251 may be provided to face the incident surface 222 of the light guide plate 220. By using the structure, light emitted from the light source is primarily diffused in the process in which the light is introduced into the diffusion member 251 through the first surface and then passed through the diffusion member 251, incident on the incident surface 222 of the light guide plate 220, and then secondarily distributed by the light guide patterns 230. Therefore, the light is more uniformly transmitted to the display panel.

The diffusion member 251 may have a width corresponding to the incident surface 222 of the light guide plate 220 so that light emitted from the light source may be effectively distributed.

The diffusion member 251 may employ a diffusion sheet, a diffusion plate, or a lenticular component Hereinafter a backlight apparatus and a display apparatus having the same in accordance with a fifth exemplary embodiment of the present disclosure will be described.

Figure 10:
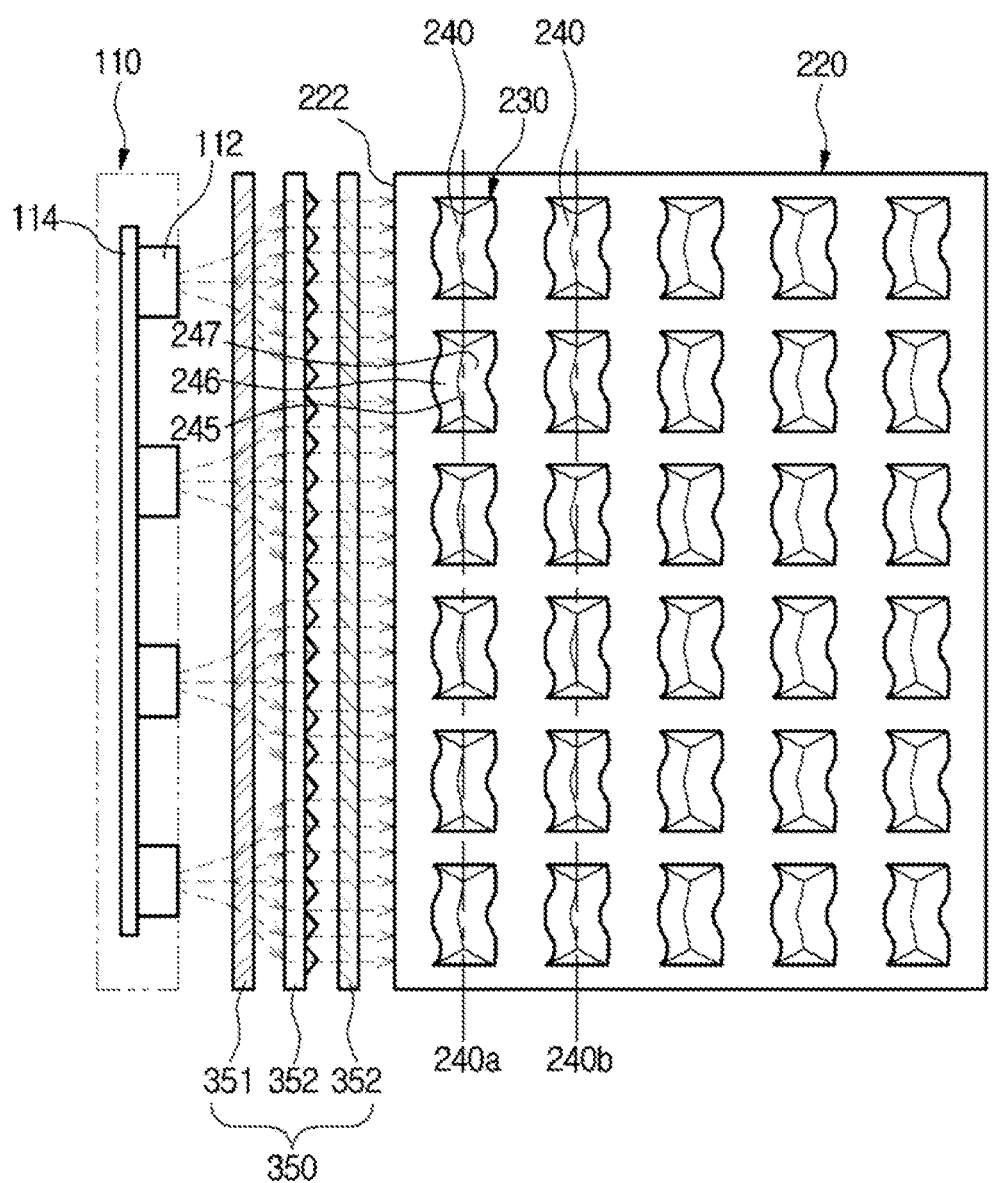
FIG. 10 is a front view illustrating a backlight apparatus in accordance with a fifth exemplary embodiment of the present disclosure.

FIG. 10 is a front view of a backlight apparatus in accordance with a fifth exemplary embodiment of the present disclosure.

A redundant description of the same components as those shown in the third exemplary embodiment will be omitted.

A backlight apparatus 300 further includes a diffusion unit 350.

The backlight apparatus 300 may include at least one of a diffusion member 351, and a reflective polarizing film 352. In addition, the diffusion unit 350 may further include a prism sheet 353. In the exemplary embodiment of the present disclosure, the diffusion member 351, the prism sheet 353, and the reflective polarizing film 352 are provided in order between the light source 110 and the incident surface 222 of the light guide plate 220.

The prism sheet 353 is provided to focus emitted light. Light emitted from the light source 110 is diffused by the diffusion member 351, and then guided toward the incident surface 222 of the light guide plate 220. A part of reflected light by the reflective polarizing film 352, which is described later, is diffused by the reflective polarizing film 352 and then transmitted toward the light source 110. The prism sheet 353 is provided to improve the efficiency of light by focusing light that is radiated and transmitted from both compartments.

The reflective polarizing film 352 transmit or reflect light incident from the light source 110. The reflective polarizing film 352 may include a first layer including a polymer material and a second layer adjacent to the first layer and including a polymer material having a different refractive index from the first layer. The first layer and the second layer may be provided in plural, and may be alternately provided. Light incident from the light source 110 passes through the reflective polarizing film 352 and a part of the light is reflected again from the reflective polarizing film 352 to the light source 110. At this time, light reflected to the light source 110 is reflected again and then incident to the reflective polarizing film 352. A part of light incident to the reflective polarizing film 352 passes through the reflective polarizing film 352, and a part of light is reflected again from the reflective polarizing film 352 to the light source 110.

That is, the reflective polarizing film 352 is formed in a way that a polymer layer having a different refractive index is alternately stacked, and uses a principle of, transmitting the polarized light in the other direction only, and reflecting the polarized light in the same direction by orienting the molecular orientation of the polymer in one direction. Therefore, the efficiency of the dispersion of light emitted from the light source 110 may be improved.

In the exemplary embodiment of the present disclosure, example is given using a plurality of sub light guide patterns is applied to the light guide plate 220, but the configuration is not limited thereto, and may be applied to the light guide patterns of the first exemplary embodiment of the present disclosure.

Hereinafter a backlight apparatus and a display apparatus having the same in accordance with a sixth exemplary embodiment of the present disclosure will be described.

Figure 11:
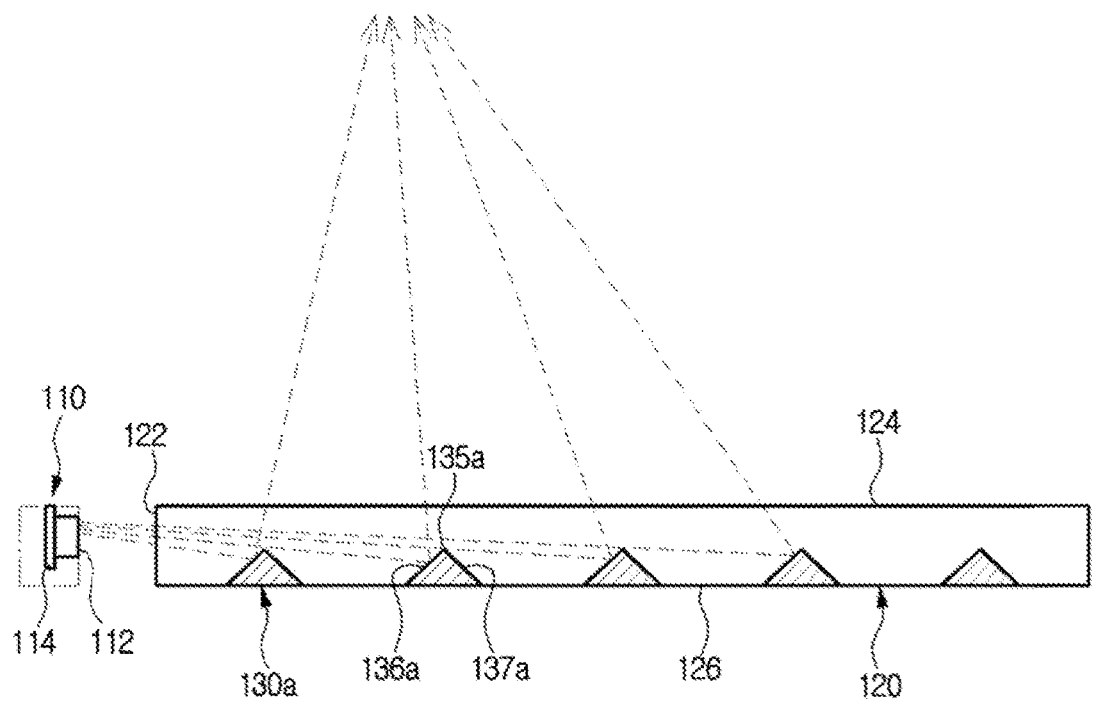
FIGS. 11 to 13 are views illustrating various light guide patterns of a backlight apparatus in accordance with a sixth exemplary embodiment of the present disclosure.
Figure 12:
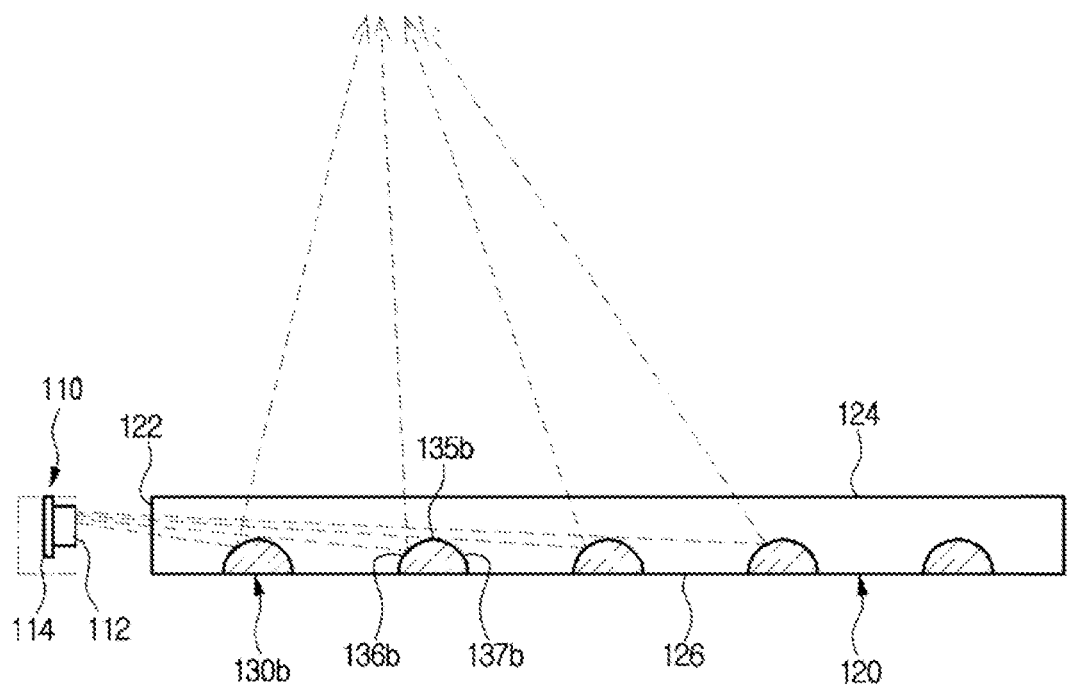
Figure 13:
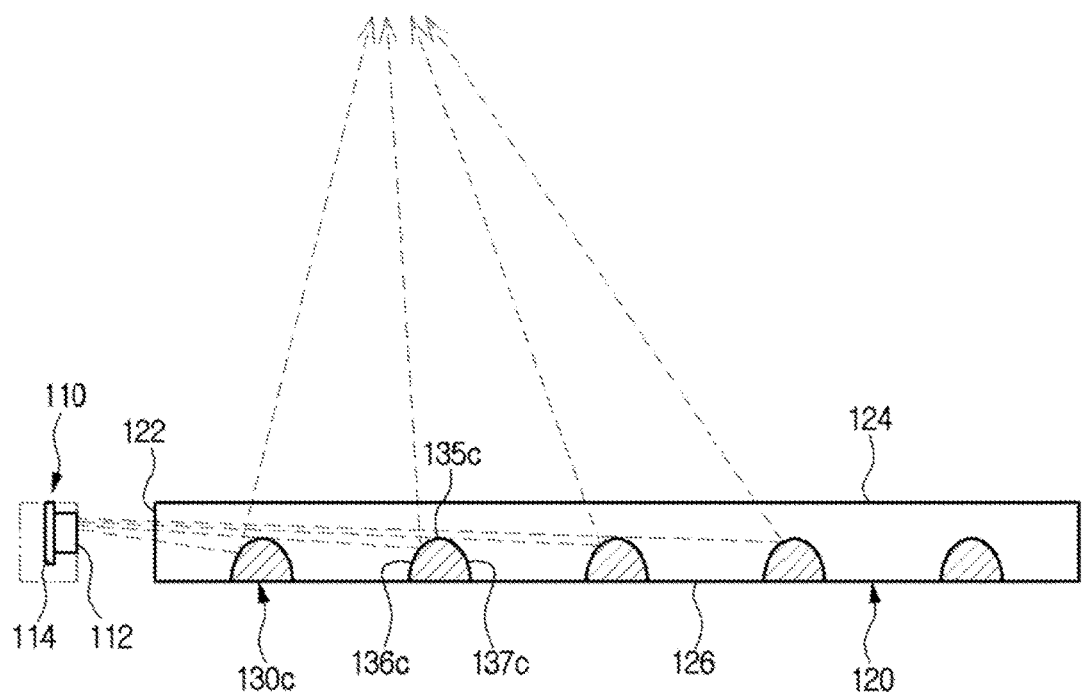

FIGS. 11 to 13 are views of various light guide patterns of a backlight apparatus in accordance with a sixth exemplary embodiment of the present disclosure.

A redundant description of components the same as those shown in the third exemplary embodiment will be omitted.

The light guide patterns 130a, 130b and 130c may include a pattern protrusion part 135a, 135b and 135c, a first inclined surface 136a, 136b and 136c and a second inclined surface 137a, 137b and 137c, all of which form a waveform.

The pattern protrusion part 135a, 135b and 135c is provided to form a waveform by protruding with a certain height from the reflective surface 126. The first inclined surface 136a, 136b and 136c is formed to be inclined from the pattern protrusion part 135a, 135b and 135c to the reflective surface 126 in a direction that is close to the light source 110. The second inclined surface 137a, 137b and 137c is disposed in the other side of the first inclined surface 136a, 136b and 136c with respect to the pattern protrusion part 135a, 135b and 135c, and is inclined from the pattern protrusion part 135a, 135b and 135c to the reflective surface 126.

Waveforms generated by the pattern protrusion part 135a, 135b and 135c, the first inclined surface 136a, 136b and 136c, and the second inclined surface 137a, 137b and 137c may be the same. That is, widths of the light guide patterns 130a, 130b and 130c may be the same.

The pattern protrusion part 135a, 135b and 135c, the first inclined surface 136a, 136b and 136c, and the second inclined surface 137a, 137b and 137c may have various shapes, as will be described below.

As illustrated in FIG. 11, a cross section of the light guide patterns 130a may have a triangular shape. Accordingly, the pattern protrusion part 135a may be formed by a tangent line of the first inclined surface 136a and the second inclined surface 137a. That is, the pattern protrusion part 135a is formed in the shape of a curve, and a cross section of the first inclined surface 136a and the second inclined surface 137a is the shape of a straight line.

Alternatively, as illustrated in FIG. 12, a cross section of the light guide patterns 130b may be a semicircular shape. Accordingly, the pattern protrusion part 135b becomes a part that is the furthest part from the reflective surface in the semicircle shape, and a cross section of the first inclined surface 136b and the second inclined surface 137b are formed by a curve from the pattern protrusion part 135b to the reflective surface Alternatively, as illustrated in FIG. 13, a cross section of the light guide patterns 130c may be a semi-ovular shape. Accordingly, the pattern protrusion part 135c becomes a part that is the furthest part from the reflective surface in the semi-ovular shape, and the first inclined surface 136c and the second inclined surface 137c are formed by a curve, which forms a part of an oval, from the pattern protrusion part 135c to the reflective surface.

Because the light guide patterns 130a, 130b and 130c is formed in the shape of a curve, light passed through the incident surface 122 may be reflected in various directions by the light guide patterns 130a, 130b and 130c, and thus a uniform distribution of amount of light may be acquired on the display panel.

As is apparent from the above description, according to the proposed backlight apparatus and the display apparatus having the same, refraction, reflection, and dispersion of light may be effectively performed by improving light guide patterns provided on the light guide plate so that light may be uniformly transmitted to the display panel and bright portion and dark portion may be reduced.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A backlight apparatus comprising:
    a plurality of light sources configured to generate light; and
    a light guide plate configured to guide the generated light towards a display panel,
    wherein the light guide plate comprises light guide patterns provided in a length direction that is a first direction in which the plurality of the light sources is disposed, and disposed to be spaced from each other by a predetermined distance,
    wherein the light guide patterns are configured to form a waveform transverse in the first direction,
    wherein the plurality of light sources comprises a first light source provided on a first side of the light guide plate, and a second light source provided on a second side of the light guide plate, the first side of the light guide plate opposing the second side of the light guide plate,
    wherein the light guide patterns comprise a first light guide pattern adjacent to the plurality of light sources, and a second light guide pattern spaced apart from the plurality of light sources further than the first light guide pattern, and
    wherein the second light guide pattern is larger than the first light guide pattern.

2. The backlight apparatus according to claim 1, wherein the waveform comprises a sinusoidal waveform of a plurality of grooves disposed towards the light source and a plurality of threads interconnecting the plurality of grooves and disposed away from the light source, and
    wherein the plurality of grooves and the plurality of threads are alternately disposed.

3. The backlight apparatus according to claim 1, wherein the light guide plate comprises:
    an incident surface upon which the light is incident;
    an exit surface from which the light is emitted; and a reflective surface opposing the exit surface,
    wherein the light guide patterns are disposed on the reflective surface.

4. The backlight apparatus according to claim 3, wherein each of the light guide patterns comprises:
    a pattern protrusion part configured to form the waveform;
    a first inclined surface extended from the reflective surface towards the pattern protrusion part; and a second inclined surface extended from the reflective surface towards the pattern protrusion part,
wherein the first inclined surface is disposed closer to the plurality of light sources than the second inclined surface.

5. The backlight apparatus according to claim 4, wherein the first inclined surface and the second inclined surface have a shape of the waveform.

6. The backlight apparatus according to claim 4, wherein the pattern protrusion part is a certain height from the reflective surface that is disposed closer to the exit surface than the reflective surface.

7. The backlight apparatus according to claim 1,
wherein each of the light guide patterns comprises:
a pattern protrusion part configured to form the waveform;
a first inclined surface extended from the reflective surface towards the pattern protrusion part; and
a second inclined surface extended from the reflective surface towards the pattern protrusion part,
wherein the first inclined surface is disposed closer to the plurality of light sources than the second inclined surface.

8. The backlight apparatus according to claim 7, wherein the first light source comprises a first plurality of light emitting diodes (LEDs) and the second light source comprises a second plurality of LEDs,
wherein the first plurality of LEDs and the second plurality of LEDs are spaced apart from each other in the first direction.

9. The backlight apparatus according to claim 1, wherein the light guide patterns comprise a plurality of sub light guide patterns provided in parallel to the light source and spaced apart from to each other.

10. The backlight apparatus according to claim 9, wherein the plurality of sub light guide patterns comprises:
a first array of sub light guide patterns arranged in parallel to the light source; and
a second array of sub light guide patterns adjacent to the first array,
wherein the first array of sub light guide patterns and the second array of sub light guide patterns are parallel to each other.

11. The backlight apparatus according to claim 9, wherein the plurality of sub light guide patterns comprises:
a first plurality of sub light guide patterns of a first array in parallel to the light source; and
a second plurality of sub light guide patterns of a second array adjacent to the first array,
wherein the first plurality of sub light guide patterns of the first array and the second plurality of sub light guide patterns of the second array are alternately disposed.

12. The backlight apparatus according to claim 9, wherein the plurality of sub light guide patterns comprises:
a first plurality of sub light guide patterns of a first array in parallel to the light source; and
a second plurality of sub light guide patterns of a second array adjacent to the first array,
wherein the second plurality of sub light guide patterns of the second array is formed to be larger than the first plurality of sub light guide patterns of the first array.

13. The backlight apparatus according to claim 1, wherein the plurality of light sources comprises:
a plurality of light emitting diodes (LEDs) spaced apart from each other in the first direction in at least one side of the light guide plate.

14. The backlight apparatus according to claim 1, wherein the pattern protrusion part is formed in a rounded shape.

15. The backlight apparatus according to claim 4, wherein the pattern protrusion part is formed by a tangent line of the first inclined surface and the second inclined surface.

16. The backlight apparatus according to claim 1, wherein the light guide patterns are formed to have a cross section of semi-circular shape or a semi-ovular shape.

17. The backlight apparatus according to claim 1, wherein the waveform is formed to have a wavelength of 20~50 μm.

18. The backlight apparatus according to claim 1, wherein the waveform is formed to have an amplitude of 1~2 μm.

19. The backlight apparatus according to claim 3, wherein the light guide patterns are formed to be concave with respect to the reflective surface in the light guide plate, and
wherein the reflective surface comprises a reflection coating applied to the reflective surface so that the path of light incident from the incident surface is guided to the exit surface.

20. The backlight apparatus according to claim 3, wherein the backlight apparatus further comprises:
a diffusion unit disposed between the light guide plate and the light source, the diffusion unit configured to disperse light emitted from the light source and incident to the incident surface.

21. The backlight apparatus according to claim 20, wherein the diffusion unit comprises at least one of a diffusion member and a reflective polarizing film.

22. The backlight apparatus according to claim 21, wherein the diffusion unit further comprises a prism sheet.

23. A display apparatus comprising:
a display panel; and
a backlight apparatus supplying light to the display panel,
wherein the backlight apparatus comprises:
a plurality of light sources; and
a light guide plate configured to guide light incident from the light source towards the display panel,
wherein the light guide plate comprises:
an incident surface upon which the light is incident;
an exit surface from which the light is emitted; and
light guide patterns provided in parallel to the incident surface, and configured to guide the light incident from the incident surface to the exit surface, and the light guide patterns configured to form a waveform transverse in a direction parallel to the incident surface, and disposed to be spaced from each other by a predetermined distance
wherein the plurality of light sources comprises a first light source provided on a first side of the light guide plate, and a second light source provided on a second side of the light guide plate, the first side of the light guide plate opposing the second side of the light guide plate,
wherein the light guide patterns comprise a first light guide pattern adjacent to the plurality of light sources, and a second light guide pattern spaced apart from the plurality of light sources further than the first light guide pattern, and
wherein the second light guide pattern is larger than the first light guide pattern.

24. The display apparatus of claim 23, wherein the waveform comprises a sinusoidal waveform of a plurality of grooves disposed towards the light source and a plurality of threads interconnecting the plurality of grooves and disposed away from the light source,
wherein the plurality of grooves and the plurality of threads are alternately disposed.

25. The display apparatus of claim 23, wherein the light guide plate comprises:
a reflective surface opposing the exit surface,
wherein the light guide patterns are disposed on the reflective surface.

26. The display apparatus of claim 25, wherein each of the light guide patterns comprises:
a pattern protrusion part configured to form the waveform;
a first inclined surface extended from the reflective surface towards the pattern protrusion part; and
a second inclined surface extended from the reflective surface towards the pattern protrusion part,
wherein the first inclined surface is disposed closer to the plurality of light sources than the second inclined surface.

27. A backlight apparatus comprising:
a light guide plate provided with light guide patterns formed shaped as a waveform, and disposed to be spaced from each other by a predetermined distance, the light guide plate configured to guide incident light towards a display panel, and
a plurality of light sources comprises a first light source provided on a first side of the light guide plate, and
a second light source provided on a second side of the light guide plate, the second side of the light guide plate opposing the first side of the light guide plate,
wherein the light guide plate comprises:
a reflective surface,
a pattern protrusion part configured to form the waveform,
a first inclined surface extended from the reflective surface towards the pattern protrusion part, and
a second inclined surface extended from the reflective surface towards the pattern protrusion part,
wherein the first inclined surface is disposed closer to the plurality of light sources than the second inclined surface,
wherein the light guide patterns comprise a first light guide pattern adjacent to the plurality of light sources, and a second light guide pattern spaced apart from the plurality of light sources further than the first light guide pattern, and
wherein the second light guide pattern is larger than the first light guide pattern.

28. The backlight apparatus of claim 27, wherein the first inclined surface and the second inclined surface have a shape of the waveform.

29. The backlight apparatus of claim 27, wherein the first light source comprises a first plurality of light emitting diodes (LEDs) and the second light source comprises a second plurality of LEDs,
wherein the first plurality of LEDs and the second plurality of LEDs are spaced apart form to each other in a first direction, and
wherein the light guide patterns are formed in the first direction.

* * * * *